United States Patent
Wu (10) Patent No.: US 12,255,880 B2
(45) Date of Patent: Mar. 18, 2025

(54) CRYPTOGRAPHIC DEVICE, SYSTEM AND METHOD THEREOF

(71) Applicant: Paul Ying-Fung Wu, Saratoga, CA (US)

(72) Inventor: Paul Ying-Fung Wu, Saratoga, CA (US)

(73) Assignee: Paul Ying-Fung Wu, Saratoga, CA (US)

(*) Notice: Subject to any disclaimer, the term of this patent is extended or adjusted under 35 U.S.C. 154(b) by 543 days.

(21) Appl. No.: 17/528,230

(22) Filed: Nov. 17, 2021

(65) Prior Publication Data
US 2023/0155825 A1 May 18, 2023

(51) Int. Cl.
| | |
|---|---|
| *H04L 9/40* | (2022.01) |
| *G06F 21/72* | (2013.01) |
| *H04L 9/08* | (2006.01) |
| *H04L 9/14* | (2006.01) |
| *H04L 9/32* | (2006.01) |

(52) U.S. Cl.
CPC .......... *H04L 63/0478* (2013.01); *G06F 21/72* (2013.01); *H04L 9/0825* (2013.01); *H04L 9/0861* (2013.01); *H04L 9/0866* (2013.01); *H04L 9/14* (2013.01); *H04L 9/3278* (2013.01)

(58) Field of Classification Search
CPC ... H04L 9/0861; H04L 9/0825; H04L 9/0866; H04L 9/14; H04L 9/3278; H04L 9/0877; H04L 9/3231; H04L 63/04; H04L 63/0428; H04L 63/0435; H04L 63/0442; H04L 63/045; H04L 63/0478; G06F 21/72; G06F 21/32
See application file for complete search history.

(56) References Cited

U.S. PATENT DOCUMENTS

| | | | | |
|---|---|---|---|---|
| 9,270,449 | B1* | 2/2016 | Tribble | H04L 63/0435 |
| 9,608,810 | B1* | 3/2017 | Ghetti | H04L 63/0428 |
| 11,019,042 | B1* | 5/2021 | Chang | H04L 63/045 |
| 2007/0204341 | A1* | 8/2007 | Rand | H04L 51/212 |
| | | | | 726/22 |
| 2012/0102334 | A1* | 4/2012 | O'Loughlin | H04L 9/3252 |
| | | | | 713/189 |
| 2012/0226905 | A1* | 9/2012 | Mohanty | H04L 63/0869 |
| | | | | 713/168 |
| 2014/0189351 | A1* | 7/2014 | Steely | G06F 21/608 |
| | | | | 713/168 |

(Continued)

*Primary Examiner* — Shaqueal D Wade-Wright
(74) *Attorney, Agent, or Firm* — Anna Tsang (57) ABSTRACT

The invention provides a device with cryptographic function, which includes: a hardware unit, exhibiting hardware-intrinsic properties; a key generating unit, generating a private key according to the hardware-intrinsic properties, and generating a public key according to the private key, for exchanging public keys with an outside device to convert communication payload information into first encrypted information based on the received public key; and a session operational unit, establishing a session key configured to encrypt the first encrypted information into second encrypted information to be transmitted between the cryptographic device with cryptographic function and the outside device. The key generating unit further optionally generates a secret key according to the hardware-intrinsic properties for securing data at rest in the cryptographic device.

3 Claims, 7 Drawing Sheets

(56) References Cited

U.S. PATENT DOCUMENTS

| | | | |
|---|---|---|---|
| 2016/0241405 A1* | 8/2016 | Jeong | H04L 63/0428 |
| 2018/0176223 A1* | 6/2018 | Hutchinson | H04L 9/16 |
| 2019/0052635 A1* | 2/2019 | Liu | G06F 21/53 |
| 2019/0207775 A1* | 7/2019 | Nishimae | H04L 9/088 |

* cited by examiner

CRYPTOGRAPHIC DEVICE, SYSTEM AND METHOD THEREOF

BACKGROUND OF THE INVENTION

Field of Invention

The present invention relates to a cryptographic device, system, and method thereof, especially a cryptographic device, system, and method with dual-path authenticated key-exchange security mechanisms for encrypting a first encrypted information into a second encrypted information.

Description of Related Art

In the prior art cryptography, Fast Identity Online (FIDO) Alliance defines a standard protocol which emphasizes a device-centric model, wherein authentication over the wire happens by using public-key cryptography. That is, a user's device registers/enrolls the user to a server by registering a public key. Then, the cryptographic device signs a challenge from the server using private keys that it holds to authenticate the user. The cryptographic device's private keys can be used only after they are unlocked locally on the cryptographic device by the user. The local unlock can be accomplished by a user-friendly and secure action such as swiping a finger, entering a personal identification number (PIN), speaking into a microphone, inserting a second-factor device or pressing a button. However, the key length of the 'static' private key, such as 128 to 256 bits, coupled with side-channel-attack vulnerabilities of asymmetric-key cryptography, allows the difficulty of breaching the public/private key-pair to be barely at a medium security level, particularly in view of the imminent arrival of the Quantum Computing Attack on asymmetric-key cryptography. Thus, it is of high priority to resolve such a weakness for establishing a high level of trust with non-compromised end-to-end communications.

On the aspect of provisioning and protecting the private key that resides in a user's cryptographic device, a physical unclonable function (PUF) is a hardware-based security measure, that provides a physically-defined "digital fingerprint" serving as a unique identifier and a source for generating secure key material, is getting more and more attention. The PUF exploits inherent randomness introduced during manufacturing to be presented as a unique physical entity (for example, characteristics extracted from minute parasitic circuit variations that happened during semiconductor-device manufacturing among different IC chip sites). The unique physical entity can be leveraged in a variety of applications, such as anti-counterfeiting, identification, authentication and key generation. However, the traditional randomness supported by the PUF identifiers may be only at a medium level; that is, the variations among the PUF identifiers (that can be termed as the PUF identifier diversity) are limited. Such PUF identifier's diversities are usually not sufficient and exhibit biased physical properties, such that the randomness (typically measured by the Hamming Distance) may be not very strong and could be deciphered by statistical modeling means with only a moderate effort.

Biometrics technology is also a security measure that is gathering interest. It uses unique information obtained on the human body to overcome the unreliability of PIN numbers or traditional passwords. Currently, various biometric identification and authentication technologies are developed based on unique physical and biological characteristics of an individual, such as: iris, handwriting or signature, hand shape, voiceprint, face shape, and fingerprint.

In addition to the above-mentioned security systems, there are still other security systems, such as dongles, or other form-factored devices storing verification data for access-control purpose, not necessarily observing the FIDO protocol. These devices can be used for accessing a system without inputting passwords, which offer convenience of obviating the use of passwords. Granted, they provide the conveniences of not forgetting or mistaking the passwords. However, the stored verification data can be sniffed with which to pass the security check by cheating with the said sniffed information. Furthermore, such a dongle HSM (Hardware Security Module) usually requires clean-room provisioning facilities that implies a high start-up cost and life-time secrets management overhead for the dongle vendor.

Further, account password is the most used security option currently in the market, which is very traditional and often challenged for its insufficient safety and inconvenience. First, the account password is easily leaked by credential stuffing attack. Additionally, the safety-deficiency of storing the passwords, and requirements of periodically renewing the passwords are also burdens for both the user and the service provider. Furthermore, the service provider's ability to safeguard the vast password database has always been challenged and questioned.

According to the present invention, a novel cryptographic technology is provided to achieve high decryption barrier even associated with low PUF identifier diversity and FIDO public keys of medium security level. Independently, PUF-generated keys can achieve high diversity due to present invention's novel entropy-entanglement process. Further, in the present invention, there is no need to keep a password.

SUMMARY OF THE INVENTION

In view of the above, the present invention provides a device with cryptographic functions, which include: a hardware unit, exhibiting hardware-intrinsic properties; a key generating unit, generating private keys and secret keys (or, secret storage keys) according to the hardware-intrinsic properties, and generating corresponding public keys according to the private keys (said public keys can be either persistent or ephemeral in nature), for exchanging public keys with an outside device to convert communication payload information into first encrypted information based on the received public key; and a session operational unit, establishing a session key configured to encrypt the first encrypted information into second encrypted information to be transmitted between the cryptographic device with cryptographic function and an outside device. Therein, the encrypting process in the present invention increases the decryption difficulty of extracting the original communication payload information from the second encrypted information communication payload information. The randomness provided in the second encrypted information greatly increases over the first encrypted information so that the second encrypted information is at a higher security level. This mechanism effectively raises the strength of an asymmetrical-key cryptography to the level of a symmetrical-key cryptography. For instance, in its defensive strength against Quantum Computing Attack. Furthermore, a single-path key-exchange process's vulnerability against MITM (Man-In-The-Middle) attack is eliminated with a dual-path authenticated-key-exchange flow mechanism. We note herein the reason why a dual-path authenticated-key-exchange fundamentally preempts MITM attack. It is because when the two independently exchanged keys or tokens are entangled (either by simple linear entanglement such as the XOR 'Exclusive-OR' function, or by nonlinear entanglement such as a nonlinear-permutation function) into a single key or token, with at least one path of the two-path key-exchange performed under end-to-end identity-based authentication, the middleman or middlemen in collusion have no means of accessing or computing the final entangled key or token. This attack scenario is further deemed implausible for the middlemen as they have to defeat the identity-based authentication verification to begin with. Further, because generated according to the hardware-intrinsic properties, the private key (s) is based on silicon-based trust. In other words, the private key(s) is based on no human trust.

Besides the cryptographic operation for the first and second encrypted information, in one embodiment, a public key for digital-signature verification (by a Digital Signature Algorithm) (PKv, hereinafter for the public key for digital-signature verification) is not presented to the wide-public. Rather, it (the PKv) is only necessarily presented to a server operated by a trust-domain in encrypted form. Such measure significantly narrows the attack vector space on asymmetric-key cryptography. Such measure beneficially retains the freedom of the end-to-end parties to securely exchange public keys for accomplishing two-way mutual authentication, of course with different sets of public keys than those used for the initial session-opening dual-path authenticated-key-exchange. Additionally, such measure discloses no intermediate secrets of the end-to-end parties to the trust-domain server. That is, more specifically, notwithstanding the fact that the trust-domain server facilitates the authenticated-key-exchange process that produces the session key secured and shared exclusively by the two end-to-end parties, such trust-domain server has no means of cracking the session key even if it were to attempt such malicious act.

In one embodiment, the second encrypted information can be decrypted into the first encrypted information according to the session key, and the first encrypted information can be decrypted back to the communication payload information according to the private key sourced from the cryptographic device with cryptographic function operating.

In one embodiment, the public key is encrypted by symmetric-key cryptography before being transmitted between the cryptographic device with cryptographic function and the outside device.

In one embodiment, a PUF identifier is obtained according to the hardware-intrinsic properties in the hardware unit, wherein the hardware-intrinsic properties are literally transferred, by an entanglement function, into the PUF identifier. The inherent measurable physical properties of the hardware-intrinsic properties can be in terms of electrical, optical, acoustic, thermal, material, geometric, or other physical properties.

In one embodiment, the public key encrypted by a session key is transmitted between the cryptographic device with cryptographic function and the outside device. The second encrypted information is transmitted between the cryptographic device with cryptographic function and the outside device. That is, the second encrypted information can be transmitted from the outside device to the cryptographic device with the cryptographic function. Or, in one embodiment, the second encrypted information encrypted according to another public key sourced from the outside device, can be transmitted from the cryptographic device with the cryptographic function to the outside device.

In one embodiment, the cryptographic device with cryptographic function, further includes a biometric identification unit, for identifying whether a user has a matched biometric feature for accessing the cryptographic device with cryptographic function.

In one embodiment, the matched biometric feature can be combined, through an entanglement function, with the hardware-intrinsic properties for defining a set of private keys.

In one embodiment, the public key can be encrypted with a session key into the encrypted public key before being transmitted between the cryptographic device with cryptographic function and the outside device.

In one embodiment, the public key is generated according to an asymmetric-key cryptography from the private key.

In one embodiment, the encryption on the first encrypted information and the decryption from the second encrypted information can be operated according to symmetric-key cryptography associated with a session key. The said session key is not and never transmitted between the cryptographic device with cryptographic function and the outside device. The first principle is, such that, a session key shall only be the result of an authenticated-key-exchange process.

In one embodiment, the data stored in the storage unit in the cryptographic device with cryptographic function is encrypted according to a secret key, typically distinct from all private keys that are commissioned for public-key derivation. For example, the storage unit includes a hard disk, a flash memory, or boot sector. "Data at rest" may mean the data remained to be stored in the cryptographic device even when the cryptographic device is turned off. Such secret keys can be utilized for safeguarding both the internally stored data and externally stored data (such as those stored in the cloud) of the cryptographic device with cryptographic function. Furthermore, such secret keys can be commissioned to bestow identities and storage-encryption for an external device or a cloud device such as Virtual Machines (VMs) operating in a remote data center. When the cryptographic device with cryptographic function bestows identity and storage encryption on a remote VM, the cryptographic device with cryptographic function operates as the Identity-Master and Secrets-Master of such a VM. That is, the VM's storage and identity secrets cannot be breached by any means other than, possibly, side-channel attacks, even if perpetuated by attempts from the VM-service provider of the data center. Further, the administrator of the VM does not have a cryptography-related authorization for the stored data in the VM.

In one embodiment, the key generating unit generates a plurality of private keys according to the hardware-intrinsic properties, and correspondingly generates a plurality of public keys according to the private keys, for respectively encrypting different communication payload information into a plurality of first encrypted information.

In one embodiment of combining the hardware-intrinsic properties with the matched biometric feature for defining the private key, wherein the key generating unit can generate different private keys according to the hardware-intrinsic properties with different biometric features. That is, when different users accessing the same device, the key generating unit can generate different private keys respectively corresponding to different users. Such a per-user private key can be named as a Proxy-Identity of the respective user safeguarded by the cryptographic device with cryptographic function. When the user desires to authenticate herself to a cloud service, she activates and engages the cryptographic device with cryptographic function to conduct authentication communication in real-time on her behalf, most likely carried out through user interface on a kiosk device such as one of her PCs or smartphones (where the kiosk device in turn links up with the nearby cryptographic device with cryptographic functions, plugged-in or wirelessly, for completing the proxy identity authentication). Thus, the Proxy-Identity and the proxy role served by the cryptographic device with cryptographic function is of substance to the user, in that it obviates her from using insecure means of account login and account transactions such as by entering a password.

In one embodiment, the key generating unit generates the private key corresponding to the hardware-intrinsic properties and the communication payload information.

The communication payload information can be at least combined with the hardware-intrinsic properties (or with the matched biometric feature and the hardware-intrinsic properties) to define a private key, and this combination may include at least one attribute of the communication payload information.

Therefore, the cryptography in the present invention can support a compartmentalized security management covering individual communication payload information, the users, and the cryptographic devices. Meanwhile, the present invention provides a concise and powerful cryptographic function to manage the complicated security arrangements between the communication payload information, the user, and the cryptographic device.

In one embodiment, the session key can be a long-term key or a short-term (ephemeral) key.

In one perspective, the present invention provides a cryptographic device including: a biometric identification unit, for identifying whether a user has a matched biometric feature for engaging the cryptographic device with cryptographic function; a hardware unit, including hardware-intrinsic properties; a key generating unit, generating a private key according to the hardware-intrinsic properties and the matched biometric feature, and generating a public key according to the private key, for exchanging public keys with an outside device to encrypt communication payload information into first encrypted information based on the received public key; and a session operational unit, establishing a session key configured to encrypt the first encrypted information into the second encrypted information to be transmitted between the cryptographic device with cryptographic function and the outside device, or decrypting the second encrypted information into the first encrypted information.

In one perspective, the present invention provides a cryptographic method, which includes: generating a private key according to hardware-intrinsic properties in a device with cryptographic function; generating a public key according to the private key, the public key sent to an outside device for encrypting the communication payload information into first encrypted information based on the public key; and encrypting the first encrypted information into the second encrypted information according to a session key.

DESCRIPTION OF THE PREFERRED EMBODIMENTS

The objectives, technical details, features, and effects of the present invention will be better understood through the detailed description of the embodiments below, with reference to the drawings.

Figure 1A:
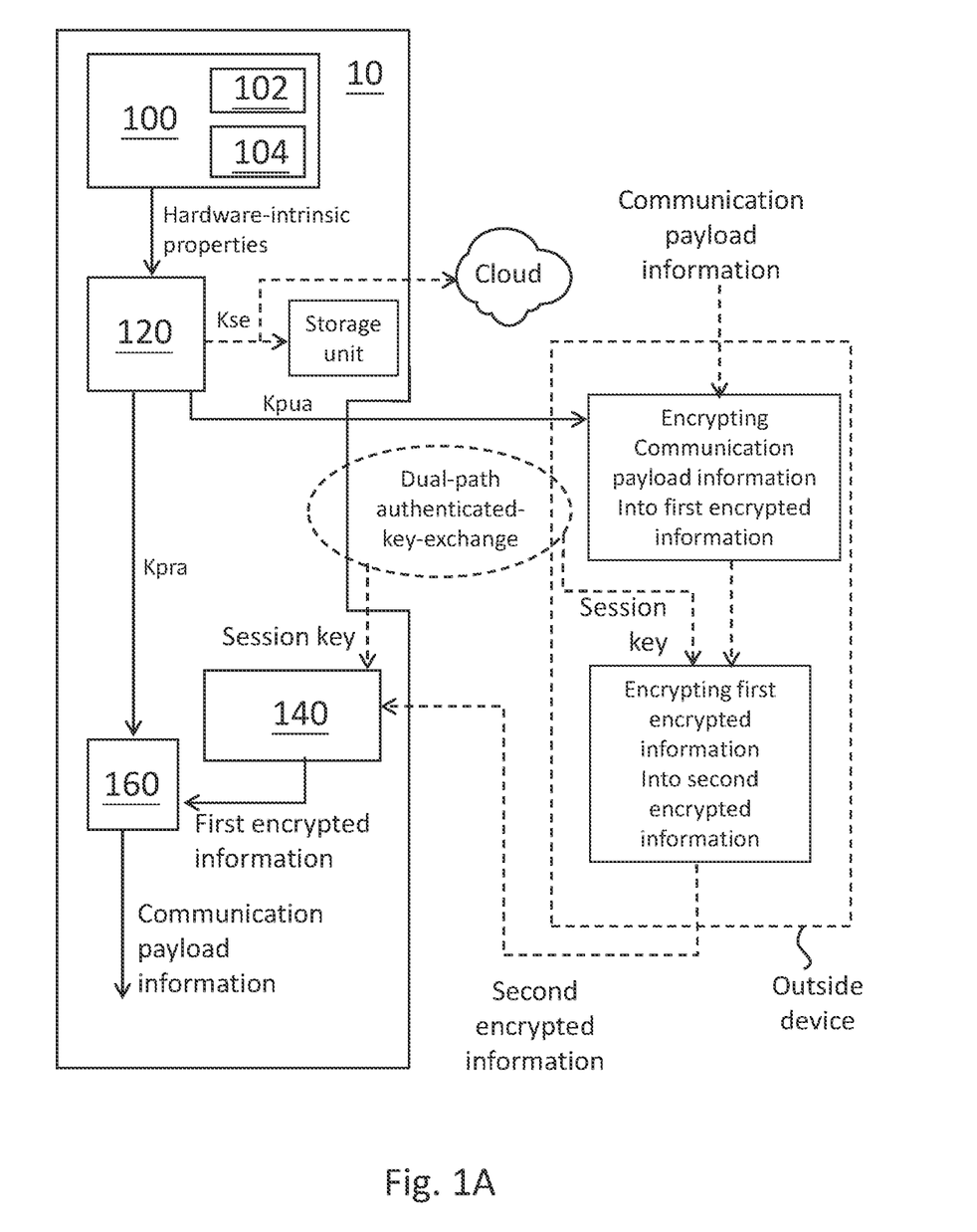
FIGS. 1A, 1B, and 1C show schematic diagrams of the cryptographic device, system, and related private key tracking method according to the present invention.
Figure 1B:
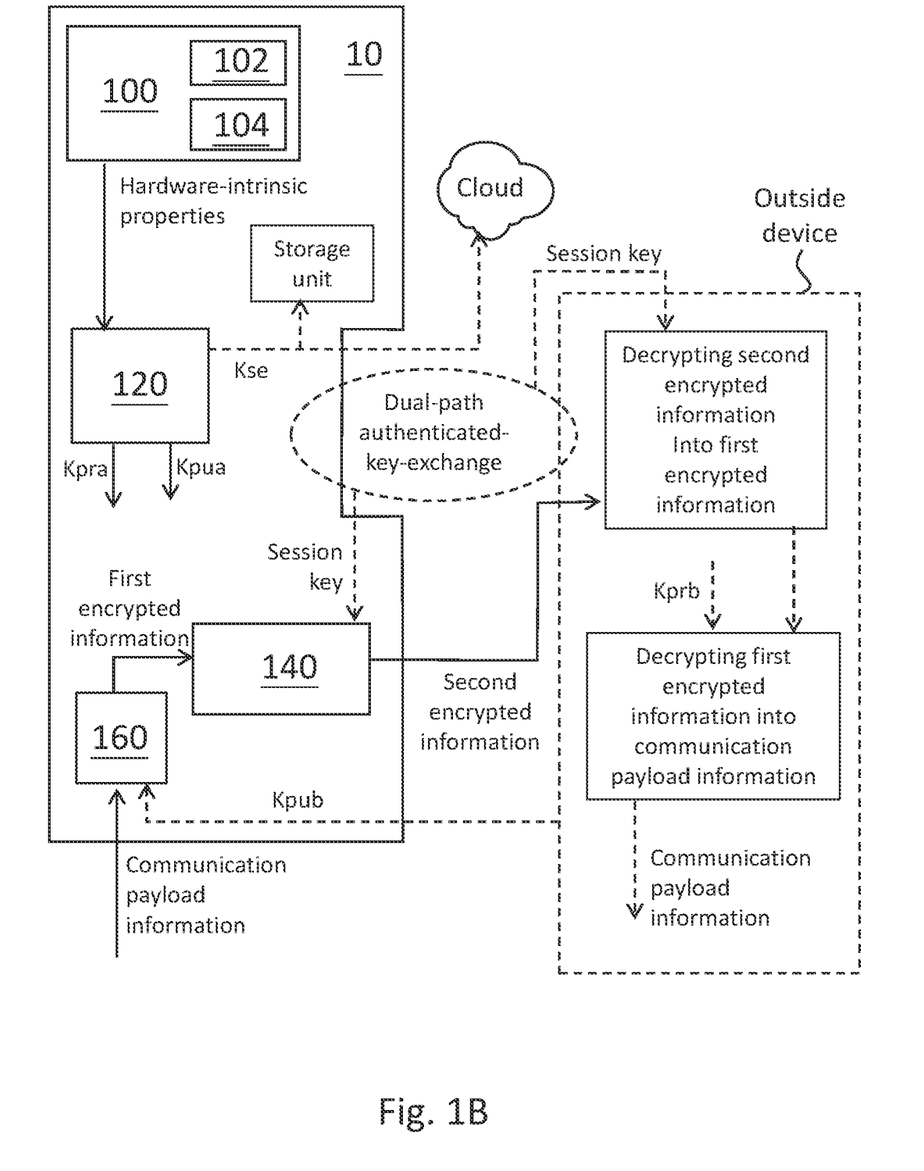

Referring to FIGS. 1A and 1B, the present invention provides a cryptographic device 10, which includes: a hardware unit 100, including hardware-intrinsic properties, wherein the hardware-intrinsic properties are based on inherent measurable differences in terms of physical properties, which are not predetermined neither controllable in the manufacturing process (the management cost of these naturally occurring hardware-intrinsic properties is much lower than the prior art account password management); a key generating unit 120, generating a private key Kpra according to the hardware-intrinsic properties, and generating a public key Kpua according to the private key Kpra, for exchanging public keys Kpua with an outside device to encrypt communication payload information into first encrypted information based on the received public key Kpua; and a session operational unit 140, establishing a session key configured to encrypt the first encrypted information into the second encrypted information to be transmitted between the cryptographic device and the outside device (or, establishing a session key for decrypting the second encrypted information into the first encrypted information). The key generating unit 120 further optionally generates a secret key Kse according to the hardware-intrinsic properties for securing data at rest.

As shown in FIGS. 1A and 1B, the hardware unit 100 further includes PUF identifiers 102 and a recovering unit 104, which provides a checkpointing feature to periodically mark measurements of this function and thereby track drift in the value of the PUF identifiers 102 over the life of the hardware unit 100. The checkpointing feature permits rollback of any measurement of the function in a manner that negates incremental drift and permits recovery of the PUF identifiers 102 for the life of the hardware unit 100.

In one embodiment, one purpose of the session key of the session operational unit 140, is to increase the randomness (effectively, increasing the security strength) by converting the first encrypted information into the second encrypted information. More precisely speaking, the outwardly apparent entropy of the second encrypted information has been elevated from a public key, whether static or ephemeral in nature, that is generated by an asymmetric-key cryptography such as ECC (Elliptic Curve Cryptography) to a ciphertext of a symmetric-key cryptography such as AES-GCM (Advanced Encryption Standard with Galois Counter Mode). Through this step, the difficulty of decrypting the second encrypted information all the way back to the communication payload information by a third party, increases very significantly.

In one embodiment, the randomness of the PUF identifiers 102 can satisfy a higher level of security requirement, due to the randomness enhancement mechanism injected into the second encrypted information. Further, the PUF identifiers 102 can be greatly improved to a high security level, as the recovering unit 104 can periodically mark measurements and thereby track drift in the value of the PUF identifiers 102 over the life of the hardware unit 100. Independently, the PUF identifiers 102 can ingrain high entropy from the get-go, as the present invention's key-entanglement process that maps the PUF hardware signature to a set of PUF identifiers can remove all aggregate per-bit biases inherited from the PUF structure.

In the previous embodiment, the outside device is another device outside the cryptographic device 10. The application-level operations such as account transaction or data-exchange between the cryptographic device 10 and the outside device, can be commenced after having mutually authenticated each other.

The difference shown in between FIG. 1A and FIG. 1B, is mainly in the different cryptographical information-flow directions. In FIG. 1A, the communication payload information comes from inside or outside the outside device, and the outside device converts all the way from the communication payload information (through the first encrypted information) to the second encrypted information, respectively according to the public key Kpua from the cryptographic device 10 and a session key. The second encrypted information is transmitted from the outside device to the cryptographic device 10 with the cryptographic function. In FIG. 1B, the communication payload information comes from inside or outside the cryptographic device 10 with cryptographic function, and the cryptographic device 10 coverts all the way from the communication payload information to the second encrypted information, respectively according to the public key Kpub from the outside device and a session key. The public key Kpub is generated according to a private key Kprb. The second encrypted information is transmitted from the cryptographic device 10 to the outside device.

Please refer to FIG. 1A again, in one embodiment, wherein the session operational unit 140 can be used to convert the second encrypted information back to the first encrypted information by decryption associated with a session key. The cryptographic device 10 further includes a processing unit 160 configured to decrypt the first encrypted information back to the communication payload information with the private key Kpra. Additional operations performed on the first encrypted information by processing unit 160 can include 1) generating a Digital Signature or verifying authenticity of a Digital Signature according to a Digital Signature algorithm such as ECDSA (Elliptic Curve Digital Signature Algorithm), 2) performing on this device's-end of a two-way shared secret-key computation according to an end-to-end Key Exchange algorithm such as ECDHE (Ephemeral Elliptic Curve Diffie-Hellman). In the ensuing discussion from this point on, we shall adopt the convention that by using the terms 'encryption' and 'decryption' broadly we include not only symmetric-key cryptography such as AES-GCM but also asymmetric-key cryptography such as Digital Signature Algorithm and Key Exchange cryptographical operations. The encryption and decryption between the communication payload information and the first encrypted information, being operated in asymmetric-key cryptography modes, are generated according to asymmetric-key computation associated with the private key Kpra and the public key Kpua.

Referring to FIG. 1B, the first and second encrypted information are generated in the cryptographic device 10. The processing unit 160 can be used to convert the communication payload information to the first encrypted information by encryption associated with the public key B from the outside device. The session operational unit 140 can be used to convert the first encrypted information to the second encrypted information by encryption associated with a session key.

Therefore, the encryption and decryption between the first encrypted information and the communication payload information are operated according to asymmetric-key cryptography associated with the private key and the public key. The encryption and decryption between the first and second encrypted information are operated according to symmetric-key cryptography associated with a session key. Therein, even with the apparent high randomness of the second encrypted information, the cryptographic device 10 can decrypt it through a cascaded asymmetric-key cryptography and symmetric-key cryptography flow, to obtain the original communication payload information.

In one embodiment, the present invention is a cryptographic technique compliant with Fast Identity Online (FIDO) standard which emphasizes a device-centric model, wherein authentication over the wire happens by using PKv cryptography. A user's device registers the user to the outside device server by registering a public key. Then, the cryptographic device 10 signs a challenge from the outside device using private keys that it holds to authenticate the user. The cryptographic device's private keys can be used only after they are unlocked locally on the cryptographic device 10 by the user. The local unlock can be accomplished by a user-friendly and secure action such as keyed by a PUF identifier.

In one embodiment, the present invention is a cryptographic technique combining both symmetric and asymmetric key encryption within a single protocol's encryption device. As one knows, symmetric key encryption relies upon secure initial key exchange, and all subsequent key replenishment to be secure; otherwise, its communications can be compromised if the key were known by an unauthorized third-party, and in some cases its previous communications, if recorded, can later be compromised should previously-exchanged or previously-replenished keys be compromised. Asymmetric key encryption provides an alternative to purely-symmetric key encryption, where a public key can be disclosed publicly and even over an insecure medium (susceptible to eavesdroppers), but without compromising plaintext encrypted using the public key, assuming that the corresponding private key remains securely stored and maintained. Furthermore, asymmetric-key cryptography provides for nonrepudiation (that is, neither party could claim at a later time that they did not participate in a communication), which feature is not possible with symmetric-key cryptography.

However, asymmetric key encryption can require more computation and/or more memory when compared to purely-symmetric key encryption, thus suffering from performance issues. More weaknesses include the following: 1) asymmetric key cryptography is considered to exhibit one-half in key strength as compared to a symmetric key counterpart of the same key length, 2) asymmetric key cryptography is more easily victimized by Side-Channel Attacks due to weak implementations, 3) asymmetric key cryptography is considered to be more easily cracked by the imminent Quantum Computing Attack that theoretically can resolve the public-key/private-key equation (for example, in Elliptic Curve, $Public\_key[x,y] = private\_key * G[x,y]$) rather swiftly. Furthermore, if more than one plaintext is encrypted using the same public/private key pair, and the private key is later compromised, all prior communications that had previously been intercepted and recorded can be compromised. The present invention can mitigate the weaknesses of both purely-symmetric key encryption and purely-asymmetric key encryption and obviate the above-mentioned problems.

In one embodiment, a PUF identifier is obtained according to the hardware-intrinsic properties in the hardware unit, by literally transferring through a key-entanglement circuit from the hardware-intrinsic properties into the PUF identifier. Note that the key-entanglement circuit capably removes any lingering bit-biases in the extracted hardware-intrinsic signature, making it impossible to correlate the PUF identifier back to the hardware. The inherent physically measurable signatures of the hardware-intrinsic properties can be in terms of electrical, optical, acoustic, thermal, material, geometric, or other physical properties. The PUF identifiers can be expressed in terms of numbers, digit, alphabets, words, marks, etc., for identifying the cryptographic device 10. In one embodiment, the private keys can be the same as the PUF identifiers; or, the private keys can be generated according to the PUF identifiers by various calculations, including further transformations performed by the key-entanglement circuit.

Figure 1C:
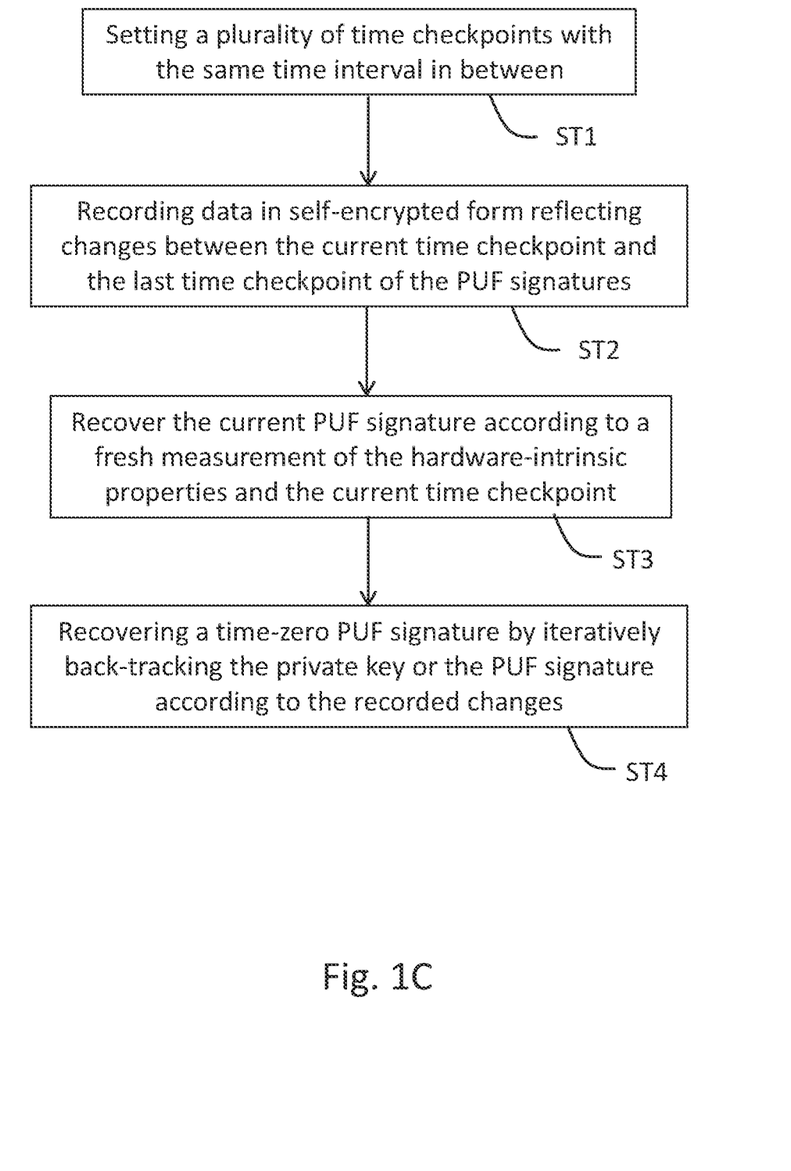

Regarding the private key, in one embodiment, the present invention also provides a tracking technology. Hardware may gradually exhibit some aging-induced drifts; that is, across a long working time, the hardware usually undergoes certain physical drifts; for example, increasing noise or offsets, or decreasing circuit performance stability. These aging drifts may change the hardware-intrinsic properties, such that the extracted hardware signatures can show changes due to these changed hardware-intrinsic properties. Please refer to FIG. 1C, which shows a tracking method. The tracking method includes: setting a plurality of time-based checkpoints with the same or variable time interval in between (ST1); recording data in self-encrypted form reflecting changes between the current time checkpoint and the last time checkpoint of the PUF signature (ST2); recovering a prior time PUF signature from the current time PUF signature according to a fresh measurement of the hardware-intrinsic properties and the current time checkpoint, iterating through a multiple bit-wise perturbational attestation computation loop until one that passes all the attestation 'constraints' is found (ST3), noting that the said "multiple bit-wise perturbational attestation loop" is run-time efficient and is not subject to prior-art exponential-time search hurdle, due to its novel bit-chunk orthogonal-segmentation mechanism; recovering a time-zero PUF signature by iteratively (or in a single-step, in another embodiment) back-tracking the PUF signature according to the recorded chronological changes as stored in a self-encrypted form of a checkpoint data (ST4). Through these steps, the time-zero PUF signature can be precisely recovered with high confidence (for instance, with an error rate of 1e-300). With the time-zero PUF signature precisely recovered, the time-zero PUF Identifier is by definition recovered (for instance, the PUF Identifier can be strong-encrypted by the PUF signature acting as the key-encrypting-key, KEK). We emphasize again that the time-zero PUF Identifier is a bias-free and obfuscated rendering of the time-zero PUF signature. Because the current hardware-intrinsic signatures are physical and measurable emanations of the hardware-intrinsic properties, and the recorded changes are about the intrinsic property changes, the recovered PUF identifier and the derived private keys are not stored cleartext data. Thus, the recovered private keys or the recovered PUF identifier is difficult to be sniffed.

In the present invention, except for operations in the device or user authentication stage, the cryptography based on the communication payload information does not follow the challenge and response algorithm during login or sign-on. The cryptographic operations can be mainly based on the public keys, the private keys, and the session keys. (Notwithstanding, that in Digital Signature Algorithm operations, the not-secret Number to be digitally signed is conventionally considered to be the Challenge that is typically the SHA256 digest of the document to be signed.) Importantly, the decryption of the second encrypted information is operated in the cryptographic device 10 with cryptographic function, and there is none of third-party devices involved in this operation.

In certain other applications, the cryptographic device 10 with cryptographic function can be securely coupled wirelessly or wired to a multitude of kiosk devices that the user interacts with directly. Such kiosk devices can be for example the user's smartphone (running Android or iOS mobile OS), personal computer, tablet, or smart wrist-banded watches, and so on, by example. The wireless connections between the cryptographic device 10 and a kiosk could be through BLE (Bluetooth Low Energy) or Wi-Fi, for example. Wired connections could be through USB (Universal Serial Bus) or Ethernet, for example. When the cryptographic device 10 is coupled to such a kiosk device where visual display, audio output, tactile and camera inputs are all conducted through the kiosk device, the cryptographic device 10 serves as an Identity-key master and Secure data store master for the kiosk device. In these applications, the cryptographic device 10 is the sole holder of identity secrets including all immutable cryptographic keys and the sole operator for all cryptographic operations in one embodiment of the present invention. Notwithstanding, in some other embodiments, ephemeral session link credentials that the cryptographic device 10 creates with a cloud-based service, for example, upon initial authentication of the 'proxy identity' on behalf of the user can be transferred from the cryptographic device 10 to a kiosk device with a preset expiration policy duration. Such ephemeral session-link credential caching to a kiosk device external to the cryptographic device 10 is secure in principle, while enhancing usability as the cryptographic device 10 can be detached from the kiosk device once the initial authentication is complete. In essence, such external caching of ephemeral session keys and credentials does not violate the discipline that the proxy-identity private keys shall never leave the cryptographic device 10.

In the present invention, the public key is transmitted between the cryptographic device 10 and the outside device, while the set of operated sessions keys (whether ephemeral or long-lived) are mandated to be established through an authenticated end-to-end key-exchange protocol. The second encrypted information (not the first encrypted information) is transmitted between the cryptographic device 10 and the outside device.

In the prior art, the account password information in the cryptographic device is usually kept in a storage unit, and the account password information can be sniffed by many means. However, in the present invention, the private keys and secret keys are based on the hardware-intrinsic properties that are opaque to the outside world. Importantly, the hardware-intrinsic properties are not in any formation of stored data, such that they are inherently self-encrypted secrets and very difficult to be sniffed outside the cryptographic device 10. When tamper-resistant measures are applied in the manufacture of the IC-device and circuit board that forms the cryptographic device 10, even deep physical probing, radio-frequency intrusion and interference, lithographic analysis, or X-ray/optical imaging would not be able to sniff or alter the hardware-intrinsic properties or inferring the value of the PUF identifier.

Figure 2:
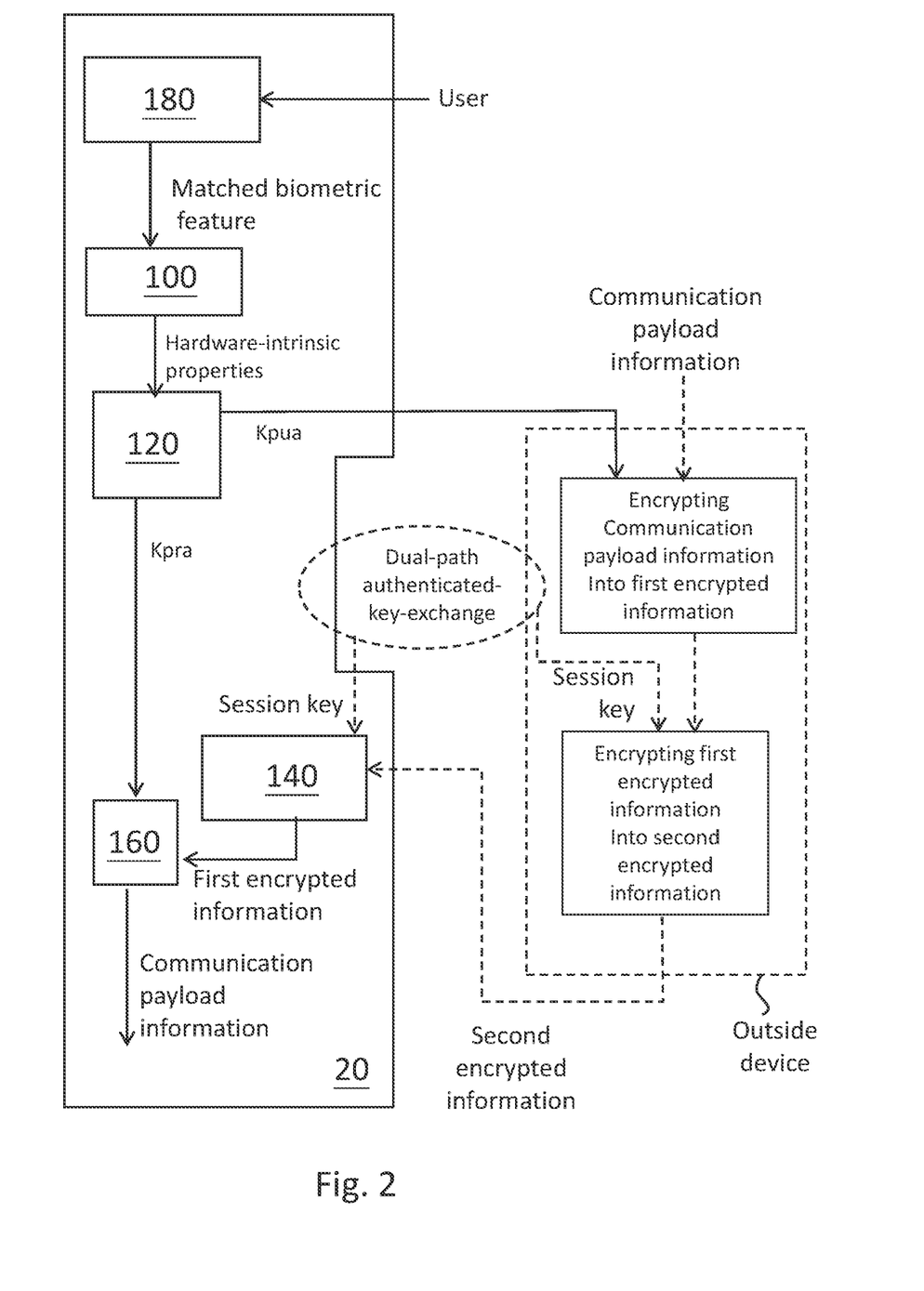
FIG. 2 shows a schematic diagram of the cryptographic device according to one embodiment of the present invention.

Please refer to FIG. 2, in one embodiment, wherein the cryptographic device 20, further includes a biometric identification unit 180, for identifying whether a user has a matched biometric feature for accessing or engaging the cryptographic device 20. For example, the biometric feature may include facial, fingerprint, hand geometry, iris feature, acoustic feature, gesture, heartbeat, signature, background portfolio, mobile identification, etc. Importantly, the biometric feature data are securely stored in the client device 20, not in the server, under the protection of the PUF-Identity-based secrets management built into device 20. In this arrangement, all data of the users in different connected devices are separately stored in the different devices and not gathered in the server, such that it is impossible to sniff any of the users' information from the server or the cloud. In short, the biometric feature library is only stored in the corresponding device but not in any other devices, to make it impossible to poach the biometric feature library.

Therefore, as shown in FIG. 2, in one perspective, the present invention provides a device 20 with cryptographic function, the cryptographic device 20 including: a biometric identification unit 180, for identifying whether a user has a matched biometric feature for accessing or engaging the cryptographic device 20; a hardware unit 100, including hardware-intrinsic properties; a key generating unit 120, generating a private key according to the hardware-intrinsic properties and the matched biometric feature, and generating a public key according to the private key, for exchanging public keys with an outside device to encrypt communication payload information into first encrypted information based on the received public key; and a session operational unit 140, establishing a session key for encrypting the first encrypted information into the second encrypted information to be transmitted between the cryptographic device 20 and the outside device. Additionally, the session operational unit 140, can decrypt the second encrypted information into the first encrypted information.

Figure 3A:
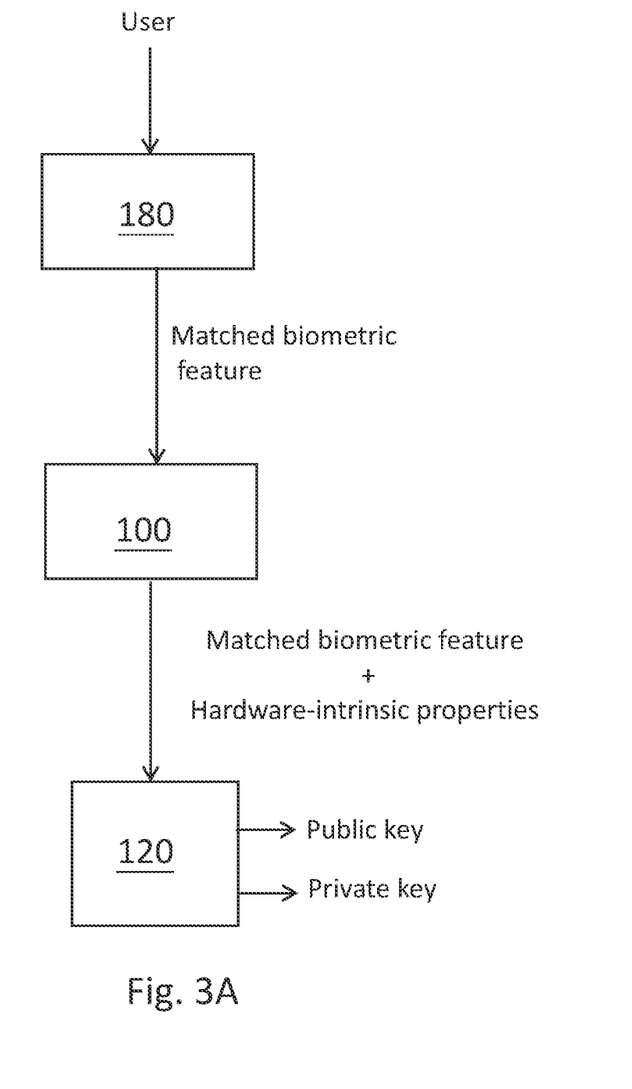
FIGS. 3A and 3B show schematic diagrams of two options of combining the biometric feature and hardware-intrinsic properties for defining the private key and the public key according to two embodiments of the present invention.
Figure 3B:
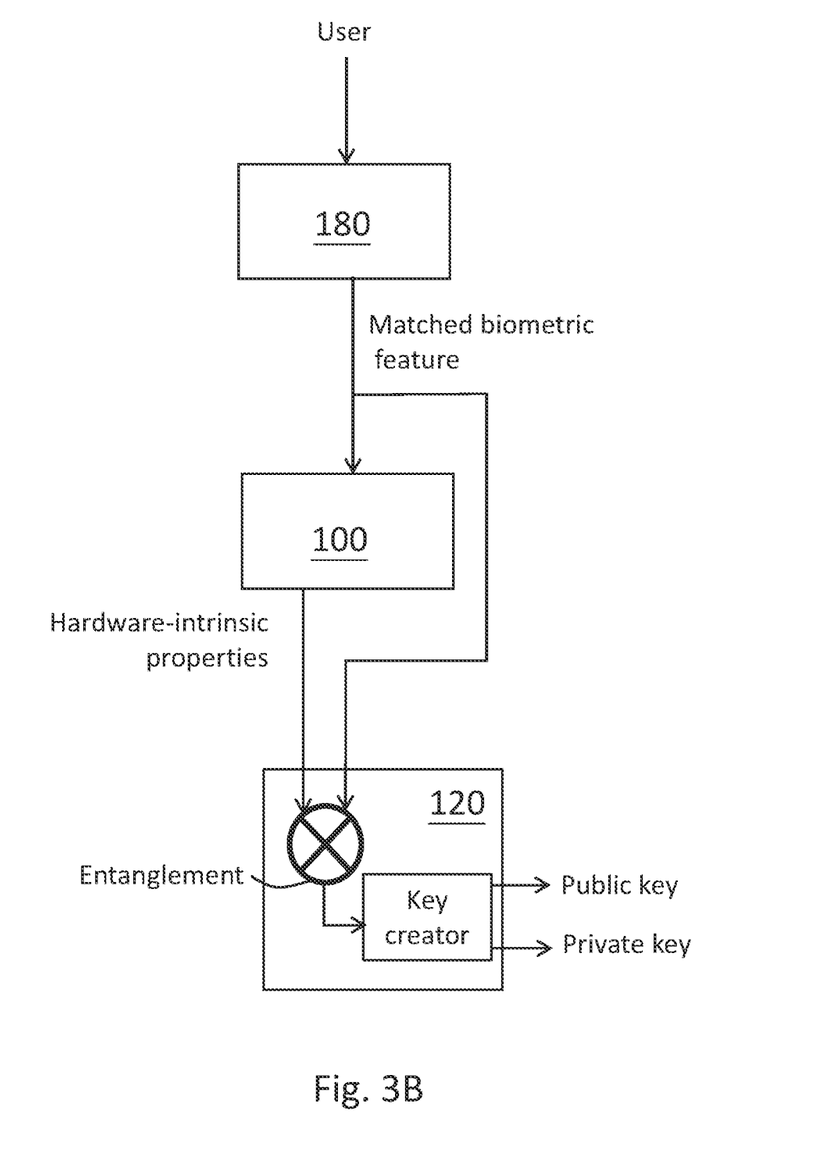

Further, in embodiments as shown in FIGS. 3A and 3B, wherein two options of combining the hardware-intrinsic properties and the matched biometric feature into the key generating unit 120 are shown, the matched biometric feature can be combined with the hardware-intrinsic properties for defining the private key (and subsequently, the public key). In this embodiment, the biometric feature of the user will be entangled (either by simple linear entanglement such as the XOR 'Exclusive-OR' function, or by nonlinear entanglement such as a nonlinear-permutation function) with the hardware-intrinsic properties for defining the private key, that effects a proxy-identity key, with which the user accesses external devices or cloud-based services. In one point of view, since the matched biometric feature is entangled with the hardware-intrinsic properties for defining the private proxy-identity key, the encryption for the communication payload information can provide an enhanced function of blocking other user (accessing the same device) from using the encrypted information, whether external or internal, of the biometrics-matched user on the same device.

In one embodiment, the public key can be further encrypted with a session key into the encrypted public key before being transmitted between the cryptographic device 10 with cryptographic function and the outside device. Thus, the public key is further secured when the encrypted public key is transmitted between the cryptographic device 10 and the outside device. Even when the encrypted public key is sniffed by others, the public key is already hardened against malfeasance because it is difficult to be decrypted from the encrypted public key or attacked in the reverse direction (that is, pilfering a session key to encrypt the public key for falsifying an outgoing communication). Further, because the randomness of the encrypted public key greatly increases through encrypting by symmetric-key cryptography means, the problem of the possibly medium-level randomness of a mediocre PUF identifier (and the derived public-private key pair) is eliminated.

In one embodiment, the public key is generated according to asymmetric-key cryptography associated with the private key. The asymmetric-key cryptography may be the popular Elliptic Curve Cryptography with a designated set of curve parameters, such as Secp256k1 and Secp256r1. In this embodiment, the public key is transmitted between the cryptographic device 10 with cryptographic function and the outside device.

In one embodiment, the encryption on the first encrypted information and decryption on the second encrypted information can be operated according to symmetric-key cryptography associated with a session key. A session key (typically ephemeral in nature, but can be long-lived depending on use case) can be generated when the cryptographic device 10 with cryptographic function is being authenticated to connect the outside device. Or a session key can be generated just after the cryptographic device 10 with cryptographic function has been authenticated to connect the outside device (quite likely as a direct result of having exercised an authenticated end-to-end key-exchange). A session key is never transmitted in its cleartext form between the cryptographic device 10 with cryptographic function and the outside device, which is in conformance with the discipline that it is best, if not mandatory, established through an identity-based authenticating-key-exchange. The private key is not a session key, nor is it similar to a session key as when the private key is or similar to a session key, the private key opens itself up to new attack vectors.

In one embodiment, the data stored in the cryptographic device 10 with cryptographic function are encrypted according to the private key, or more aptly named as a 'secret key'. Thus, the stored data need to be encrypted for any data-driven application, such that the stored data is in a minimally acceptable level of encryption security. Further, the aforementioned stored data do not necessarily include the communication payload information. For example, when the communication payload information is only a temporary message, the communication payload information is not necessarily to be encrypted. In one embodiment, the private key, the session key, and the secret key are different from one another.

In one embodiment, the key generating unit 120 can generate a plurality of private keys according to the hardware-intrinsic properties, and correspondingly generates a plurality of public keys according to the private keys, for respectively encrypting different communication payload information into a plurality of first encrypted information. Alternatively, only one private-key/public-key pair at a time is used to enforce the cryptography of the communication payload information. Therein, with the changing public keys, makes it much more difficult for others to decide the corresponding public key (among the plural public keys) to the current active-use private key when sniffing many public keys. Regarding generation of a plurality of private keys according to the hardware-intrinsic properties, there are several tools or options for creating the private keys based on the same hardware-intrinsic properties. For example, logical operators (AND, OR, XOR, etc.), nonlinear entanglement functions such as nonlinear permutation, various voltage thresholds for determining the digits, various phase difference truncation criteria for determining the numbers, etc. Such entropy or randomness generating method as a pre-cursor for entangling with the hardware-intrinsic properties to produce high entropy private or secret keys, can be understood by those skilled in the art of TRNG (True Random Number Generator).

In one embodiment of combining the hardware-intrinsic properties with the matched biometric feature for defining the private key, wherein the key generating unit 120 generates different private keys according to the hardware-intrinsic properties and different biometric features. That is, when different users access the same device, the key generating unit 120 can generate different private keys corresponding to different users, as their respective Proxy-Identities. Further, the same user can have multiple private key options, wherein when the user tries different biometric features (facial, fingerprint, hand geometry, iris feature, acoustic feature, gesture, heartbeat, signature, background portfolio, mobile identification, etc.) for accessing the same device, the key generating unit can generate different private keys corresponding to the different biometric features. Therefore, the key generating unit 120 can generate different private keys in different operation conditions.

In the previous embodiment, multiple different users may access the cryptographic device, to correspondingly have different private keys. Thus, even when the encryption and decryption of different users are operated in the same device, the communication payload information belonging to one user is not allowed to be decrypted by other users accessing the same device. According to the present invention, the separate (effectively, segregated) security management covering different users accessing the same device can be methodically implemented.

In one embodiment, the key generating unit generates the private key corresponding to the hardware-intrinsic properties and the communication payload information. That is, the key generating unit can generate a plurality of private keys respectively according to different communication payload information, and correspondingly generates the plural public keys according to the private keys, for respectively encrypting each communication payload information into the corresponding first encrypted information. Herein, an autonomous key management (for multiple dynamic key management) cryptography based on the cryptographic device and the communication payload information can be implemented, and it can be used for communication between devices (or machine to machine communication) which can be used for internet of things (IoT).

Regarding examples of generating the private keys further based on the communication payload information, the communication payload information can be at least combined, by an Entanglement function, with the hardware-intrinsic properties (or combined with the matched biometric feature and the hardware-intrinsic properties) to generate the private keys, and this combination may include various attributes of the communication payload information (for example, file name, address, size, type, date, modified time, revision, hash code, or at least one portion of the content). Herein, when the generation of the public key is based on the communication payload information and the hardware-intrinsic properties, it provides streamlined measures of separate security management covering different communication payload information associated with the same device. Further, this embodiment can support internet of things (IoT) operations even when there is no user accessing the cryptographic devices connected in the IoT. Or, when the generation of the public key is based on the communication payload information, the matched biometric feature, and the hardware-intrinsic properties, it provides streamlined measures to have separate security management covering the communication payload information, the users, and the cryptographic devices. Especially, this function can be applied to manage a large system having multiple security levels and complicated user hierarchy.

In one embodiment, a session key can be a long-term key or a short-term key. In the present invention, a session key can be mainly a short-term key such that the session key can be frequently changed for avoiding being sniffed by others.

In one embodiment, the cryptographic device can be a server for connecting other devices.

Figure 4:
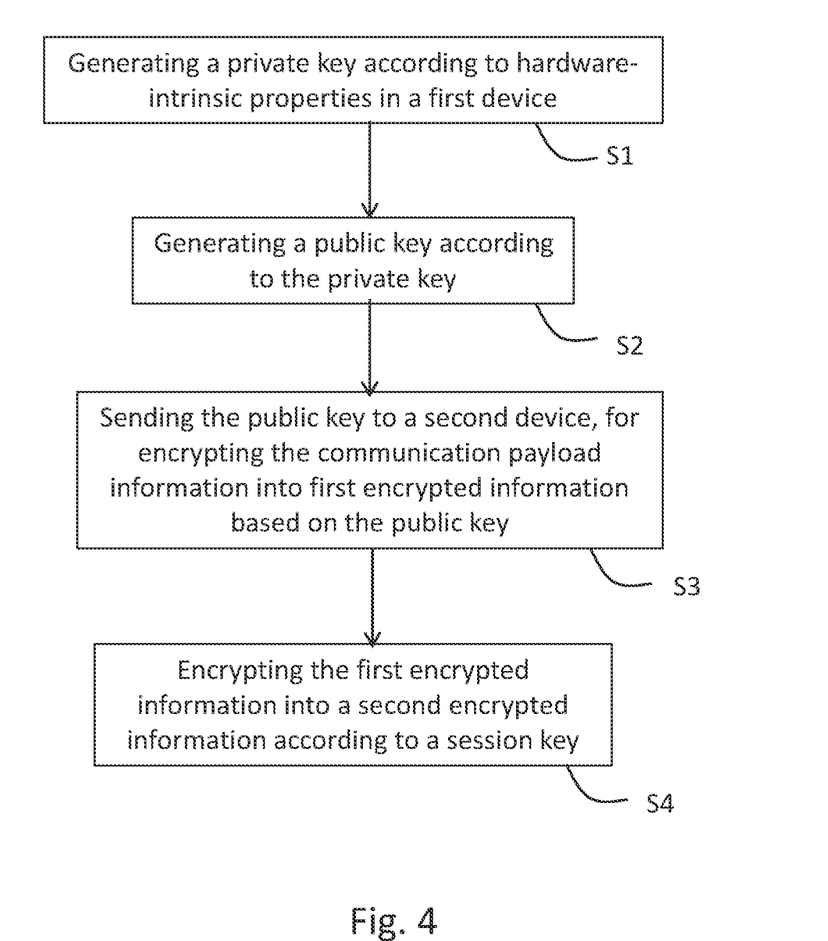
FIG. 4 shows a flow chart of cryptographic method according to one embodiment of the present invention.

Please refer to FIG. 4, in one perspective, the present invention provides a cryptographic method, which includes: generating a private key according to hardware-intrinsic properties in a first device (corresponding to the aforementioned device with cryptographic function) (S1); generating a public key according to the private key (S2), sending the public key into a second device (corresponding to the aforementioned outside device), for encrypting the communication payload information into first encrypted information based on the public key (S3); and encrypting the first encrypted information into the second encrypted information according to a session key (S4). Regarding the detail of the steps in this cryptographic method, please refer to the explanation and description of the aforementioned embodiments, as they are not redundantly repeated herein.

In one embodiment, the cryptographic method further includes: generating a session key when authenticating the first device to connect the second device; or, generating a session key right after the first device is authenticated to connect the second device. Therein, the authentication of the first device can be based on the public key generated by the first device.

In one embodiment, the cryptographic method further includes: identifying whether a user has a matched biometric feature for accessing the first device.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention.

What is claimed is:

1. A cryptographic method, including:
   providing hardware-intrinsic properties, wherein a drift in the value of the hardware-intrinsic properties are periodically marked and tracked;
   generating a private key according to the hardware-intrinsic properties in a first device;
   generating a public key according to the private key, into a second device for encrypting the communication payload information into first encrypted information based on the public key; and
   encrypting the first encrypted information into second encrypted information according to a session key and the public key, to transmit the second encrypted information between the first and second devices with two cryptographical information-flow directions,
   wherein the two cryptographical information-flow directions includes: the first device encrypting the first encrypted information to the second encrypted information according to the session key and the public key from the second device, and the second device encrypting the first encrypted information to the second encrypted information according to the session key and the public key from the first device.

2. The cryptographic method of claim 1, further including: generating the session key when authenticating the first device with cryptographic function to connect the second device.

3. The cryptographic method of claim 1, further including: identifying whether a user has a matched biometric feature for accessing the first device.

\* \* \* \* \*